US006668175B1

(12) United States Patent
Almgren et al.

(10) Patent No.: US 6,668,175 B1
(45) Date of Patent: Dec. 23, 2003

(54) METHOD AND APPARATUS FOR PROVIDING RADIO ACCESS BEARER SERVICES

(75) Inventors: Magnus Almgren, Sollentuna (SE); Christer Johansson, Täby (SE); Håkan Olofsson, Stockholm (SE); Dalibor Turina, Täby (SE); Zsolt Haraszti, Cary, NC (US); Magnus Hartman, Stockholm (SE); Niclas Lindberg, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 613 days.

(21) Appl. No.: 09/617,037

(22) Filed: Jul. 14, 2000

(30) Foreign Application Priority Data

Jul. 15, 1999 (SE) .................................................. 9902716

(51) Int. Cl.$^7$ .............................. H04Q 7/00; H04B 7/20
(52) U.S. Cl. ........................ 455/522; 455/552; 455/516
(58) Field of Search ................................ 455/522, 517, 455/516, 515, 452.1, 452.2, 453, 455, 509, 450; 370/345, 335, 341, 342, 352, 353, 329

(56) References Cited

U.S. PATENT DOCUMENTS 6,374,112 B1 * 4/2002 Widegren et al. ........ 455/452.2

2001/0036175 A1 * 11/2001 Hurtta ........................ 370/352
2001/0055971 A1 * 12/2001 Irwin et al. ................. 455/450
2003/0108027 A1 * 6/2003 Kim et al. .................. 370/345
2003/0125069 A1 * 7/2003 Lee ............................. 455/522

FOREIGN PATENT DOCUMENTS

| WO | 98/36589 | 8/1998 |
| WO | 99/01991 | 1/1999 |
| WO | 99/05828 | 2/1999 |

* cited by examiner

*Primary Examiner*—Nay Maung
*Assistant Examiner*—Edan Orgad

(57) ABSTRACT

A method and an apparatus for providing radio access bearer services for different applications in a network having a core network and a radio access network through radio access bearers between the networks are presented. One or more session traffic flows being sent by an application are identified, the identified session is characterized in the form of parameters needed for the determination of the one or more radio access bearers. The characterized parameters are converted into radio access bearer attributes. One or more radio access bearers defined by the attributes are requested and established. Each session is mapped onto a correct radio access bearer established upon receiving the request. The one or more radio access bearers are released when no longer needed.

35 Claims, 7 Drawing Sheets

METHOD AND APPARATUS FOR PROVIDING RADIO ACCESS BEARER SERVICES

This application claims priority under 35 U.S.C. §§119 and/or 365 to 9902716-1 filed in Sweden on Jul. 15, 1999; the entire content of which is hereby incorporated by reference.

The invention is concerned with a method and an apparatus for providing radio access bearer services in a network comprising a core network and a radio access network on radio access bearers between said networks. It is suitable for sending real-time services of different applications.

DESCRIPTION OF BACKGROUND ART

The operators, which administrate a telecommunications network can offer both complete telecommunications services or only bearer services. The bearer services are transport systems for the communication, whereas the telecommunications services also include functions for connection and rules for the communication.

A telecommunication service can be a basic service (as for example speech) or an application service (as for example an information data base) or an additional service (which can be a modified basic service). The telecommunication services are classified on the basis of the form they are presented in for the users, such as speech, data, video and multimedia.

Transparence is needed to send all these services through the network. A good transparence means that the delays through the coupling components in the network are minimized, that the information flow stays intact and that the bandwidth needed for the sending is available. The three most important parameters in connection with transparence are thus bandwidth, bit error and delay. The requirements on bandwidth for speech, video and data differ from each other. Video transmission e.g. sets special requirements on the networks, due to the maximal variation in delay allowed. For high quality video transmission it is required that the variations in delay are small, sometimes not more than a few milliseconds.

Different transfer modes, such as the circuit mode and the packet mode exist for transmission of the information of different services. In the circuit mode, the information is sent in time frames of given lengths. In the packet mode, the information is divided into packets with address headers for the transport through the network. It is more and more usual that the information sent changes transfer mode on the way through the network. The aim in the future is a transmission of different types of services in the same network independently of bandwidth and transfer mode.

The communication through the networks is carried out in accordance with certain agreed rules called protocols. TCP/IP is a set of protocols for packet mode used over the Internet, which is the world wide network connecting different computer networks in the whole world. The main task of the IP protocol is the addressing. The TCP protocol takes for instance care of the sequencing and flow control between the hosts.

In a communication there are two phases, the coupling and the session. In a telephone call, the conversation itself is the session. In other types of communication, the session phase is the phase during which data is transmitted between the users.

A telecommunications network is divided into the access network and the core network. The access network is the part connecting the subscriber and the local station, whereas the connections between the local stations define the core networks.

In a mobile telecommunications system, there are regularly positioned local base stations within a service area. Such an area is divided into cells with one base station for each cell. A mobile station within a radio access network communicates with the geographically closest local base station in the service area. Communication with the fixed core network thus takes place through the radio access network.

Cellular systems today are experiencing a tremendous increase. In the beginning of 90s, the major service for wireless users was speech. Speech is a real time, delay-sensitive service and the techniques used in cellular voice communication are in many aspects copied from the fixed telecommunication networks. Thus, the cellular systems are traditionally circuit-switched and communication channels across the radio interface are defined as dedicated channels.

However, recently other types of services have started to emerge in the cellular world. These are data services with rather varying requirements on the radio bearer in radio communication with respect to e.g. delay and bandwidth. The common denominator for such services is that they can take advantage of using the packet data based type of transmission.

Actually, that trend has also started on the fixed side with the tremendous growth of Internet in recent years. The TCP/IP protocol suite is the main platform for such packet data based infrastructure where different application services (communication services) are being run onto, including even voice. E-mail, Internet browsing and video conferencing are just examples of such new application services. IP is a packet mode service and offers "best effort delivery" meaning that the connection cannot be guaranteed.

Communication services between different systems can be used by means of applications. By using standardized applications, data can be changed in different systems in a simple way. The applications use TCP (The Transmission Control Protocol) or UDP (The User Datagram Protcol) as media. Examples of applications are SMTP (Simple Mail Transfer Protocol), SNMP (Simple Network Management Protocol), WHOIS (a catalogue database), NTP (Network Time Protocol), HTTP (Hyper Text Transfer Protocol) and WWW (a network of information databases). These applications are described more in detail in different RFC (Request for Comments) recommendations or they are specific for the actual service provider. The session traffic flows are of different lengths depending on application. In the future, there will be much more application services in form of voice, pictures, security etc.

Packet data based services provide opportunities to multiplex a number of users on the same communication channel and transmit information more efficiently (in terms of data throughput) than the circuit switched networks. A key feature of the radio interface is the possibility to transport multiple parallel services with different quality requirements on one connection.

Different applications sent across the interface between the core network and the radio access network require different radio access bearers for the service they provide. For packet data based services, there exists a number of attributes characterizing the radio access bearer services and a negotiation protocol across the interface between the core network and the radio access network. The performance of the application depends on these attributes for the bearer service, which may involve bandwidth, quality of service, peak bit rate, minimum bit rate etc.

Standardization of third generation mobile communication systems is now rapidly progressing in all major regions of the world. These systems, which are called IMT-2000 within ITU (International Telecommunications Union) and UMTS (Universal Mobile Telecommunications System) within ETSI (European Telecommunications Standards institute), will extend the services provided by current second generation systems, e.g. GSM, with high-rate data capabilities. The general system architecture of UMTS/IMT-2000 includes User Equipment (UE), UMTS Terrestrial Radio Access Network (UTRAN) and the Core Network. Furthermore, the general architecture includes two general interfaces of which the Iu interface is between UTRAN and the Core network and the Uu interface is between UTRAN and the user equipment.

The evolution of UMTS is just taking place and there is no finished concept on how the radio access bearer service negotiation should be performed across the Iu interface on basis of which the radio access bearers are granted. The concepts for evolving packet data based cellular solutions are also needed for other cellular systems like for example GPRS (General Packet Radio Services).

The radio access network part of the network provides radio access bearer services for the core network upon demand. Certain issues have to be taken into consideration, if packet data traffic is wished to cross the radio interface between the core network and the radio access network in a spectrum efficient way.

One problem in connection with using radio access bearer services offered for the core network is how to establish a radio access bearer needed for a certain application.

One mobile user can be granted one or more radio access bearer services, e.g. when running different applications in parallel or when a certain application requires different qualities of service for different streams. The conventional mobile subscription method does, for example, not take into consideration different application needs with respect to the attributes characterizing the bearers, and therefore there is a risk for either over- or under-dimensioned radio bearers when granting radio access bearer services (RABS) in for example UMTS.

In some types of cellular communication networks, a user defines his or her service requirements to a bearer (i.e., a service provider) in terms of one or more requested qulity-of-service (QoS) vectors or requested service vector, RSV. Each vector consists of a number of QoS parameters which relate to the required service. Alternatively, a user's requirements may be input into a computer or a computer application which performs the negotiation with the bearer. The QoS parameters may include, but are not limited to, required bit rate (peak, mean and/or some other rate), required bit error rate (BER) and required transmission delay. In addition, the user may also specify a price parameter for a desired service. For a given application, a range of values for each of these QoS parameters may be acceptable to the user. For example, in a web browsing application, a user normally desires a high bit rate for which the user is willing to pay a higher price. However, a user may tolerate a lower bit rate if the user is interested in minimizing the price. For some applications, the range of values for certain QoS parameters that the user is willing to accept may be relatively small. For example, in a voice application, the user may not be willing to tolerate a lower bit rate or a longer transmission delay because of the susceptibility of speech data to low bit rates and/or long delays. Under less than acceptable conditions, e.g., low bit rate and long delay, it may be preferable that the call be blocked.

One way the user can express its service requirements to the service provider is to define two QoS vectors, wherein the QoS parameter values in the second QoS vector represent an acceptable (or minimum level of) service. Typically, the desired QoS parameter values indicate a lower price level sensitivity on behalf of the user, as suggested above. In contrast, the acceptable QoS parameter values are associated with a higher price sensitivity. In the case of speech, the desired value and the acceptable value for certain QoS parameters (e.g., maximum transmission delay) may be the same, thus indicating a user's unwillingness to accept less than desired values for those QoS parameters. It is also possible to define a desired service, a minimum acceptable service and services therebetween.

At call set-up, handover and call re-negotiation, a determination has to be made as to which service will be used to establish a connection. The requirements of the user and the capability of the bearer have to be taken into account. The capability of the bearer can also be expressed in the form of QoS vector and may be referred to as an offered service vector, OSV. The procedure that results in generation of an OSV is called a bearer service generation. The procedure that attempts to match user requirements with bearer capabilities is called bearer service negotiation. The bearer service negotiation process results in the generation of a negotiated QoS vector or NSV. In general, a NSV contains QoS parameter values that reflect the service which the service provider is capable of providing and which satisfy requirements of the user specified values in a RSV. In the event that no match between the requirements of the user and the capability of the bearer is established, the NSV is said to be empty.

A service provider can not always guarantee the quality of service defined by the NSV. It is merely something the service provider will attempt to achieve. However, during the time period between the bearer service negotiation and, for example call-set-up, conditions may change due to such phenomena as data traffic fluctuation and fading, thereby making it impossible for the service provider to achieve the level of service defined by the NSV. If the service provider cannot achieve at least the minimum requirements, the bearer service has to be renegotiated, or in the case of an on-going call, handed over (i.e., to a different service provider) or dropped.

With data services being added to cellular networks, wireless systems engineering is faced with the task of having to accomodate connections belonging to different services each of which may have a different quality requirement. In a complex mixture of different applications using wireless access in second generation systems (such as GSM, TDMA/136 etc.) WCDMA and wireless LANs, lack of structured handling will result in a low system performance and create added difficulty to operators managing networks.

Full rate and half rate speech is currently available in commercial GSM systems and circuit switched data will soon extend to multiple slot transmission. Admission control (which controls access to a service) of these mixed services, though possible, is rudimentary since there are few service types. In addition, load of services other than full rate speech is load. Attempts to address mixed services wireless systems have focused on the task of allocating radio resources to a delay-critical service such as speech and a non-delay critical service such as data according to a predefined access control.

Several problems exist in current solutions for handling mixed services. These problems are treated on a service-by-service basis without an overall structure which leads to difficulties in a system supporting a complex mix of services.

For admission control, service differentiation and user differentiation are not covered extensively. That is, there may be resources available for one important user but not for another.

Adaptive applications, i.e. applications with multiple operation modes, are not well covered either. A video codec, for example, can operate in multiple bit rate modes. These modes correspond to the bandwidth available, and hence bandwidth negotiation has to take place at least at connection set-up.

Elastic applications, such as web browsing, which can operate in a single mode using a variety of bearers (and give the user a corresponding variety of quality) have also not been treated extensively.

In the international patent application WO 99/01991 by NOKIA TELE-COMMUNICATIONS OY, there is presented a method and an arrangement for supporting TCP/IP services in cellular radio access networks connected to a telecommunications network offering TCP/IP services. In accordance with the solution presented in this document, the bearer service parameters required by different TCP/IP services are predetermined in the radio access network, the correct parameters for a given connection being selected by identifying the TCP/IP service on the basis of the content of the first IP packet received. Thus, different TCP/IP services can be handled in a different way in the radio access network and a bearer service that best corresponds to the actual needs can be established through the radio access network by means of a local database.

There is, however, a need for faster and more flexible methods for granting the radio access bearer services, so that the IP packets could be sent on an optimal radio access bearer from the beginning of the sending.

What is also desired, is a solution for handling mixed services which is adaptive in order to accomodate applications having multiple operating modes as well as for handling elastic applications.

It should also be possible to change the radio access bearer during a session if the situation so require, since the time varying characteristics of the radio access network is a problem. The radio access network might for instance decrease (or increase) the offered bandwidth for individual users or a subset of users, due to e.g. change in traffic load or link budget, etc.

The object of the invention is a method and an apparatus for providing radio access bearer services in a network which solve one or more of the above mentioned problems.

Thus, one object of the invention is to achieve faster methods and apparatuses for establishing an optimal radio access bearer needed for a certain application.

A second object of the invention is to achieve methods and apparatuses for mapping of the data stream on the right radio access bearer.

A third object of the invention is to achieve methods and apparatuses for taking varying characteristics of the radio network into consideration.

SUMMARY OF THE INVENTION

The method of the invention for providing radio access bearer services of different applications in a network comprising a core network and a radio access network through radio access bearers between said networks, is mainly characterized by the steps of identifying one or more session traffic flows being sent by an application, characterizing the identified session in the form of parameters needed for the determination of one or radio access bearers, converting the characterized parameters into radio access bearer attributes, requesting and establishing one or more radio access bearers defined by means of said attributes, mapping each session on the correct radio access bearer established upon said request, indicating the end of a session and releasing the radio access bearer(s) when not needed anymore.

The apparatus of the invention of handling radio access bearer services of different applications in a network comprising a core network and a radio access network is a radio access bearer management node introduced in the network between said core network and radio access networks. It is mainly characterized by the means for carrying out the steps of the method of the invention.

In conclusion, the invention can provide a functional entity for example on the core network side in a network such as in UMTS or similar networks that handles the radio access bearer service negotiation process for the packet data traffic's account. Knowledge/information of the actual session flows(s) of a packet stream for identifying and characterizing the session flows is used for determination of the number of radio access bearers needed, and assigning values to the radio access bearer attributes. The method also provides for a method for mapping the user data session flow(s) onto the established radio access bearers.

Sometimes de-multiplexing has to be used in order to extract different streams from the same source, e.g. video, voice and signaling in order to map the right traffic on the right bearer.

The session traffic might have been identified with different methods to recognize and characterize the session. In one first embodiment the session is characterized by means of the packet headers of the packets of a session. In a second embodiment, the session is recognized and characterized by means of the end-to-end signaling messages in connection with the forming of a logical link for the connection. In a third embodiment, the session is recognized and characterized by means of direct signaling messages to the apparatus of the invention.

The radio access bearer attributes consist of the quality of service and bandwidth request, which in turn are based on local static conversion database, remote conversion database, user profile and /or load indicators from bearer management.

In one embodiment of the invention, changes are recognized during an on-going session, as a result of which the radio access bearer attributes are changed. The changes might be recognized so that the session is probed periodically in order to recognize changes in the application needs by any combination of the above methods of starting session flows. In one preferred embodiment, back pressure mechanisms are used to go back to the application in case of varying conditions on the radio interface, e.g. suddenly available more spectrum or worsening conditions due to bad radio conditions or congestions. The invention can be used for monitoring the traffic on an already established radio access bearer and possibly be used to adjust the bearer characteristics through radio access bearer service (RABS) re-negotiation.

The changes to be made in the radio access bearer attributes during an ongoing session can be carried out through many different re-negotiation sequences and are explained later in this text.

Thus, in the invention, the radio access bearers are granted, on the border between the core network and the radio access network, on the basis of a service negotiation that uses radio access bearer service attributes. These attributes characterize the radio access bearer services and the intention is not only to offer the bearer with the right quality of service but also to enable efficient algorithms for radio resource management. One example of the latter is the admission control algorithms which can take advantage of the knowledge about the exact application needs by granting radio access to as many mobile users as possible.

By the apparatus and methods of the invention it is possible to perform radio access negotiation for packet data based cellular systems where no obvious connections exist on the network communication level, i.e. when using IP network protocol. The proposed introduction of a logical node on the core network side, or alternatively, on the radio access network side, together with the methods for recognizing the application needs in terms of Quality of Service, provides means for efficient Radio Access Bearer Service (RABS) negotiation. Consequently, by allocating adequate RABS, it is much easier to develop admission control algorithms for spectrum efficient utilization of scarce radio resources. Further, the combination of said node and the usage of traffic recognition methods makes it possible to map the incoming packet data traffic on the right radio access bearer.

Some embodiments of the invention are described in the following by means of figures and a flow scheme. The invention is not restricted to the details of the following presentation as the invention can vary within the scope of the claims.

DETAILED DESCRIPTION

Figure 1:
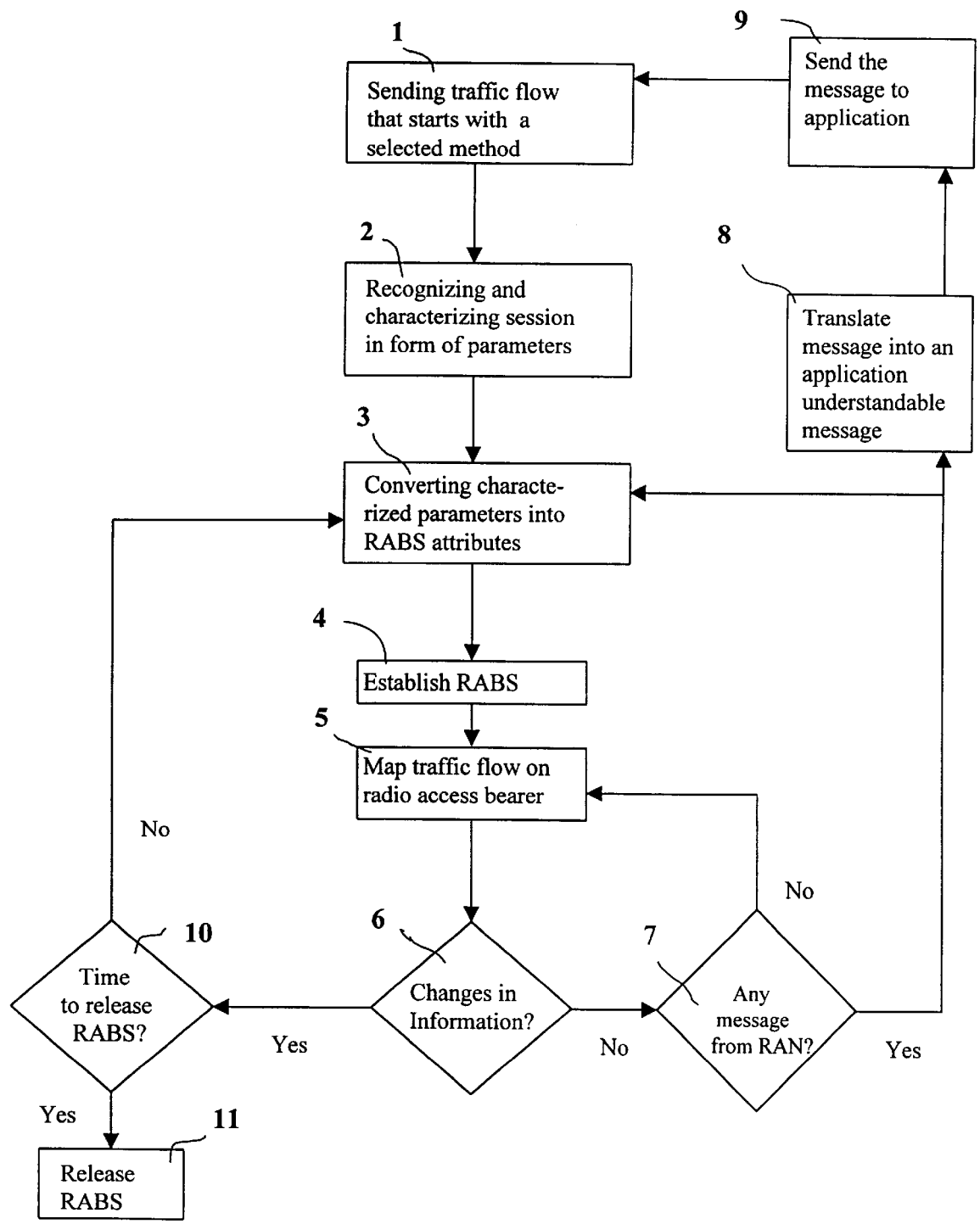
FIG. 1 describes the invention by means of a flow scheme.

Sending of a traffic flow, consisting for example of packet data of application services like voice, video, data etc., can start with different methods in different embodiments of the invention, as is indicated in FIG. 1 with reference number 1. The way of recognition and characterization of the session depends on which method has been use to start the session traffic flow. Three of these methods will be presented in the following.

In the first method, the session traffic has been sent from the application through a permanent best effort channel. A permanent best effort channel in this context means that a default radio access bearer is assumed. Such a bearer is already established but is not optimized for the actual application. In this method, the session is identified and characterized by means of the packet headers of the packets of the session. Traffic that is to be mapped on a certain radio access bearer is recognized among incoming traffic, such as IP data packets. Different streams from the same source have to be extracted, e.g. voice, video and signaling in order to characterize the traffic on per packet basis to map it on the right bearer. In every packet sent through the network there is namely in addition to the message itself, also other information, like address information, so that the packets could find the way to the right receiver. The message itself is encapsulated in so called "headers" that contain the address and other information. Other information might be for example be the type of service, length of packet, identification data etc. The type of service includes information about the delay allowed, the bit rate etc. In addition, the session can be identified by means of additional observations and measurements in the headers like information about the traffic situation and the radio recources. All this information that characterize the session is formulated in the form of "session parameters" and in this text the session is said to be characterized by said parameters.

In the second of said three methods, the session traffic has been preceded by some standard signaling/session initiation protocol, like H 3.23. The first step in this method is that a signal is sent using a best-effort channel to the end user from the application to establish a logical link between them to prepare for the real connection so that these signals contain information about the application service to be sent. The information can be in the form of the same kind of parameters as in the first method described above. The invention covers both those embodiments in which the packet data is sent through the same channel as in the logical link as those embodiments in which the signals go through an own channel. In this method, the session is identified and characterized by intercepting and interpreting these end-to-end session signaling messages which go through a radio access bearer management node introduced between the core network and the radio access network. Thus, the right bearer can be in this case be defined by means of the information about the application service in these end-to-end messages.

In the third method, the session traffic has been initiated through direct signaling to a radio access bearer management node, which according to the invention is introduced between the core network and the radio access network to handle the establishment of the right radio access bearer service in a way according to the method of the invention. In this method, the session is identified and characterized by interpreting signaling messages from the application to said node. The application, which is on the core network side, establishes sessions through direct signaling to said node, which also is on the core network side, using no radio resources at all. The node terminates signaling, after having identified the parameters needed. In this case there is no logical link established to prepare for the connection. Instead, information about the application, in form of the same kind of parameters as above, is contained in the signaling messages transmitted directly from the application to said node. Thus, the right bearer can, in this case, be defined by means of the information about the application service in these messages from the application to said node in the network.

After the session has been recognized and characterized in accordance with some of these three methods or according to some combination thereof as indicated in steps 1 and 2 of FIG. 1, the corresponding quality of service and bandwidth request is formulated by means of said characterization, which is expressed in form of "session. parameters". Said parameters are used for formulating the quality and bandwidth request, i.e. the extracted information is converted into radio access bearer attributes RABS as indicated with reference number 3 of FIG. 1, which define an existing RABS. These attributes can be determined by means of a local static conversion database (user independent, load independent), a remote conversion database, user profile or local indicators from bearer management, when the parameters mentioned are known.

A radio access bearer is then established upon request from the radio access network in step 4 of FIG. 1. Mapping of the session traffic flow on the established radio access bearer is carried out in step 5 of FIG. 1. In case of multiple sessions in a packet flow, the problem of mapping the right session flow on the correct radio access bearer (RAB) must be done on a per-packet basis, i.e. each packet has to be identified with respect to session and then mapped onto the respective RAB. It is the quality of service and bandwidth request (i.e. the RABS attributes) that determine which RAB to use. Several sessions can be mapped onto the same RAB, but preferably, if they have identical RABS attributes associated.

In a preferred embodiment of the invention, the attributes to be converted can, in addition to the parameters characterized in step 2 in connection with the beginning of the sending of a session, also be based on changes during an ongoing session.

During a session, there might be received a message from the radio access network (RAN) carrying information about changes in the radio access network situation, e.g. suddenly available more spectrum or worsening conditions due to bad radio conditions or congestions. In case of such a message from the radio access network in accordance with step 7, the message from RAN is converted into an application-understandable message in step 8 by the radio access bearer management node of the invention and is sent to the application in step 9. The application then uses the information about changes in this message in its session initiation signaling messages in accordance with said second or third method to start a sending or include it in the packet headers in accordance with said first method as indicated in step 1 of FIG. 1. The application can in this way adapt its traffic to existing channel properties (for example use another speech coder which has a lower quality but consumes less bandwidth). It is, however, not necessary to wait for the application to perform these changes in order to change the attributes. The attributes can be changed directly as is indicated with the arrow going from step 7 to step 3 in FIG. 1, by the management node of the invention, which then informs about the changes to the application.

If changes in the information (i.e. changes in the parameters) are recognized in accordance with step 6 as a consequence of a probing of the session, the new information is first analysed as is indicated in step 10 of the invention. If the changes in the information mean that there are new characteristics (i.e. parameters) for the session, they are converted into RAB attributes in step 3 and a new RABS is negotiated (i.e. renegotiated) and used as earlier was done in steps 4–5. The radio access bearer service is released in step 11 if the new information consists of initiation of the end of the session and it therefore is time to release the RABS.

Figure 2:
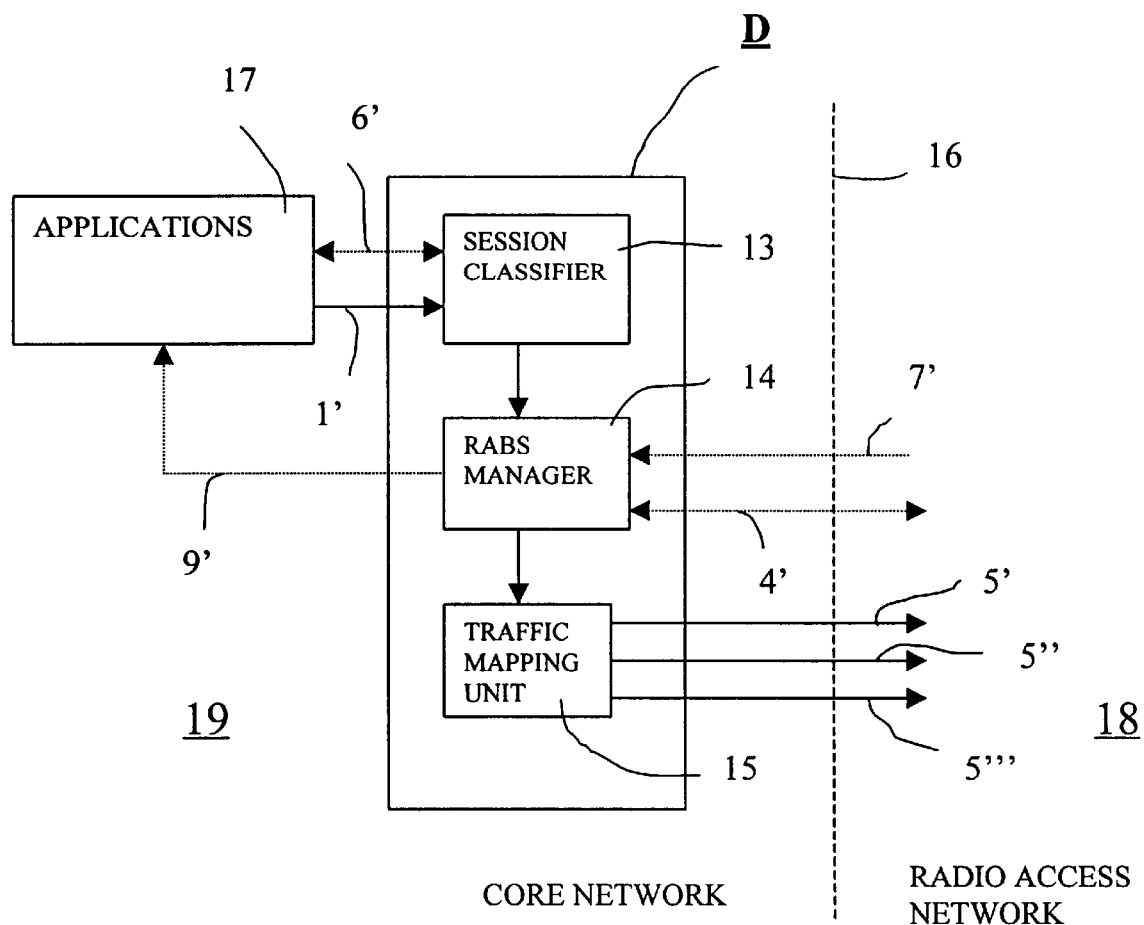
FIG. 2 is a schematic view of an apparatus of the invention as introduced in a telecommunications network

In FIG. 2 there is presented an example of a functional model for the apparatus of the invention in form of a node D. It is in FIG. 2 introduced between the core network 19 and the radio access network 18 on the core network side 19 of the Iu interface 16. Node D establishes, maintains and releases radio access bearers in accordance with the method of the invention and maps the user traffic on the right radio access bearer.

In FIG. 2, node D consists of three entities. The classifier 13 recognizes session flows sent from the application 17 as indicated with arrow 1'(step 1 of FIG. 1). The classifier 13 is programmed to extract certain information, like static parameters for a certain radio access network-core network interface (step 2 of FIG. 1). Also the conversion of these parameters into RABS attributes takes place in the classifier 13 (step 3 of FIG. 1). Session classifier 13 also probes the session periodically in accordance with double-arrow 6', so it can recognize changes in the traffic information (step 6 of FIG. 1). The classifier 13 is responsible for the characterizing of new parameters in case of changes in the traffic information and of indicating end of a session (step 6 of FIG. 1). Thus the classifier is a unit in node D that generates the information needed to determine the right RABS, which also takes place in the classifier 13 (step 3 of FIG. 1) or to release the RABS (step 11 of FIG. 1).

A request of QoS and bandwidth (i.e. the RABS attributes) is sent to a bearer manager unit 14. The radio access bearer service manager 14 has said attributes as input, which are received from the classifier 13 to establish/ negotiate radio access bearer services. The negotiation takes place between the RAN and RABS manager in accordance with double-arrow 4'. When the information from the classifier indicated the end of a session, the bearer manager unit 14 releases the RABS.

The radio access bearer manager 14 is also the "transceiver" of possible messages from the radio access network in accordance with arrow 7'(Step 7 of FIG. 1). These messages carry information about changes in the radio access network situation, e.g. suddenly available more spectrum or worsening conditions due to bad radio conditions or congestions. In case of such a message from the radio access network, the radio access bearer manager will translate this message into an application-understandable message and send it to the application in accordance with arrow 9'. The information about changes in the radio access network situation is preferably also handled in the RABS manager to directly change the attributes in bearer manager 14 to then negotiate for a new RABS.

Mapping of the user traffic on the right RAB as is indicated by the arrows 5', 5" and 5''' is carried out in the third unit 15.

There were three different methods explained to start sending of a session. Analogously, there are also different methods for changing the characteristics of a session and re-negotiate a new RABS. These alternatives are described in the following by means of FIGS. 1 and 2.

According to one embodiment of the invention, the application changes the characteristics of the on-going session. Session classifier 13 recognizes the change as a consequence of probing of the session periodically as indicated with arrow 6'. Then, the session classifier 13 "re-analyses" the flow as earlier in step 2 of FIG. 1, and determines new QoS and bandwidth demands (new attributes) as in step 3 of FIG. 1 based on new parameters. After that, the session classifier sends a re-negotiation request to the bearer manager 14. The bearer manager 14 handles the re-negotiation protocol as indicated with arrow 4' to establish a new RABS as in step 4 of FIG. 1.

According to another embodiment of the invention, the application sends end-to-end signaling messages to signal the changes in session characteristics. Session classifier 13 intercepts session signaling messages and carry out steps 2 and 3 of FIG. 1. After that, the session classifier 13 sends a re-negotiation request to the bearer manager 14. The bearer manager 14 handles the re-negotiation protocol as indicated with arrow 4' to establish a new RABS after which the application switches to use new session characteristics.

According to still another embodiment of the invention, the application sends signaling messages to node D to signal the changes in session characteristics. The session classifier 13 terminates the signaling messages and carries out steps 2 and 3 of FIG. 1. After that, the session classifier 13 sends a re-negotiation request to the bearer manager 14. The bearer manager 14 handles the re-negotiation protocol as indicated with arrow 4' to establish a new RABS after which the application switches to use new session characteristics.

The functions performed by the different entities of the apparatus of the invention can also be arranged differently between the invention and there might be other functions as is described in the following embodiments.

Figure 3:
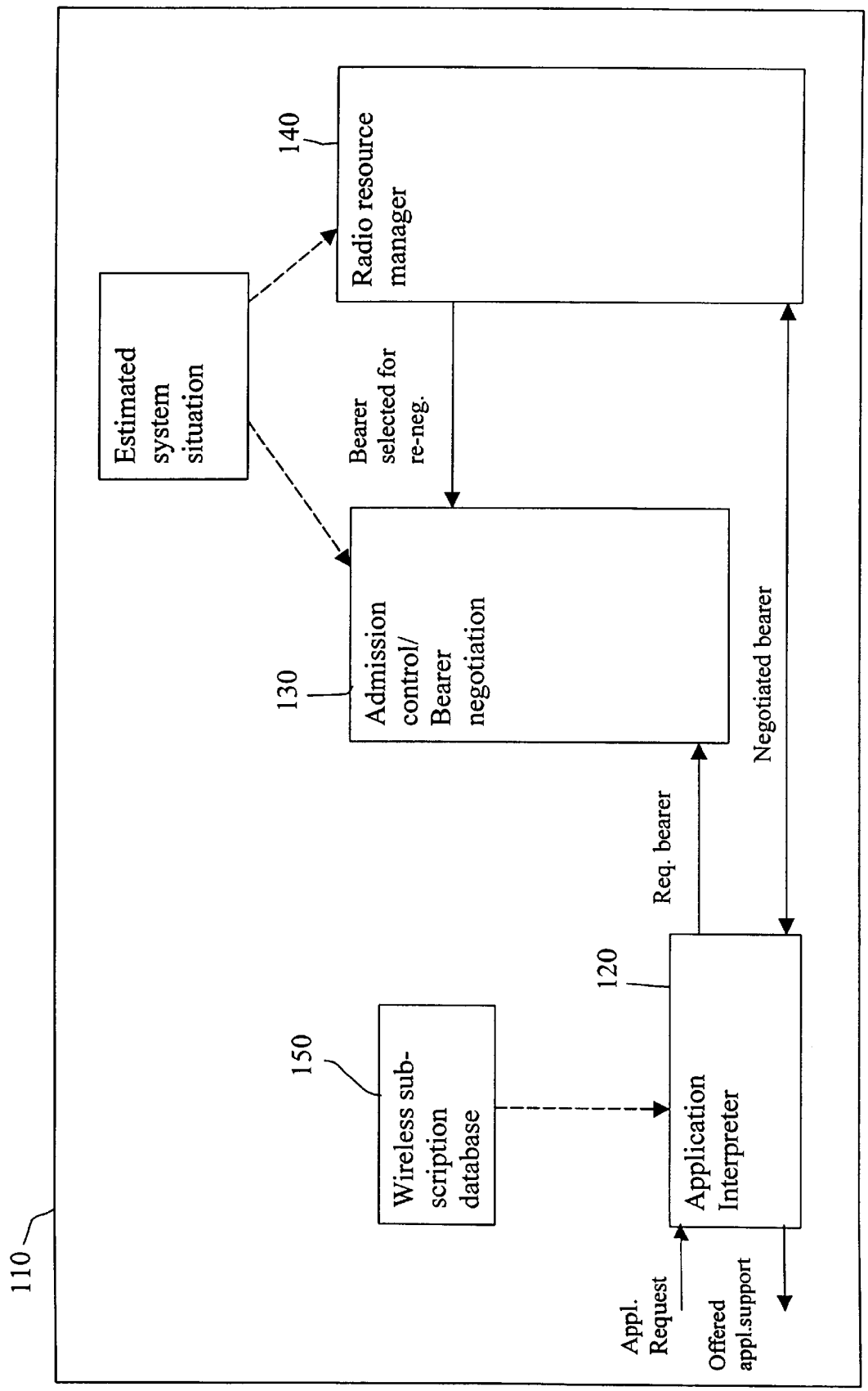
FIG. 3 is another embodiment of an apparatus of the invention as introduced in a telecommunications network for handling multiple services

According another embodiments of the invention, an admission control function is disclosed that handles a mix of services in a wireless system and partly has the functions of the RABS manager in FIGS. 1 and 2. The admission control function is part of a structure which consists of a number of functional blocks. Referring to FIG. 3, a control system 100 for service handling is illustrated which comprises three functional blocks. The blocks are: an application interpreter (A1) 120, an admission control entity 130 and a radio resource manager (RRM) 140.

The application interpreter 120 (which e.g. has functions corresponding partly to those of the session classifier and RABS manager in FIGS. 1 and 2) is activated by a request 110 for a connection from an application (Step 1 of FIG. 1). Based on this request, as well as on user specific information and other information pertaining to the needs of the application, the application interpreter 120 generates a bearer request (or, requested service vector RSV). The user specific information may be stored, for example, in a wireless subscription database 150. Information related to the needs of the application may be retrieved, for example, by monitoring the application setup signaling. This request (from the application) describes the characteristics of the desired bearer(s), i.e. the connection that is desired for carrying traffic through the wireless system. The types of information or attributes of the bearer include: (1) quality requirements for data transmitted, such as delay, frame error ratio (FER) and bit error rate (BER); (2) source information, such as how much data per unit time can be expected from the application; (3) general bearer and protocol information such as whether the bearer should be unidirectional or bidirectional, or whether erroneous frames should be forwarded to upper layers within the network; and (4) priority information that may be used to classify the importance of a bearer request and can thus be seen as the price the requesting party is willing to pay for the bearer. When used in a bearer offer (OSV), priority should be interpreted as the cost of the offered bearer. The priority may be specified directly by the user through subscription.

An application request may result in more than one requested alternative bearer (RSV). The application interpreter 120 is also able to receive a negotiated bearer (or, negotiated service vector NSV) and translate the negotiated bearer (NSV) to a message that is understood by the application.

The radio resource manager 140, which has functions corresponding to the mapping unit in FIGS. 1 and 2, receives a negotiated bearer (NSV) for each active connection. The task of the radio resource manager in FIG. 3 is to achieve optimal utility of radio resources such as power and channels in order to maintain the specified bearer quality attributes that were identified or requested by the application. The algorithms involved in performing the functions of the radio resource manager 140 include, for example, handoff, power control, code allocation and selection of modulation, channel coding and spreading factor in a CDMA system. If all parameters of the negotiated bearer (NSV) cannot be maintained, the radio resource manager 140 may order re-negotiation of one or more bearers.

Figure 4:
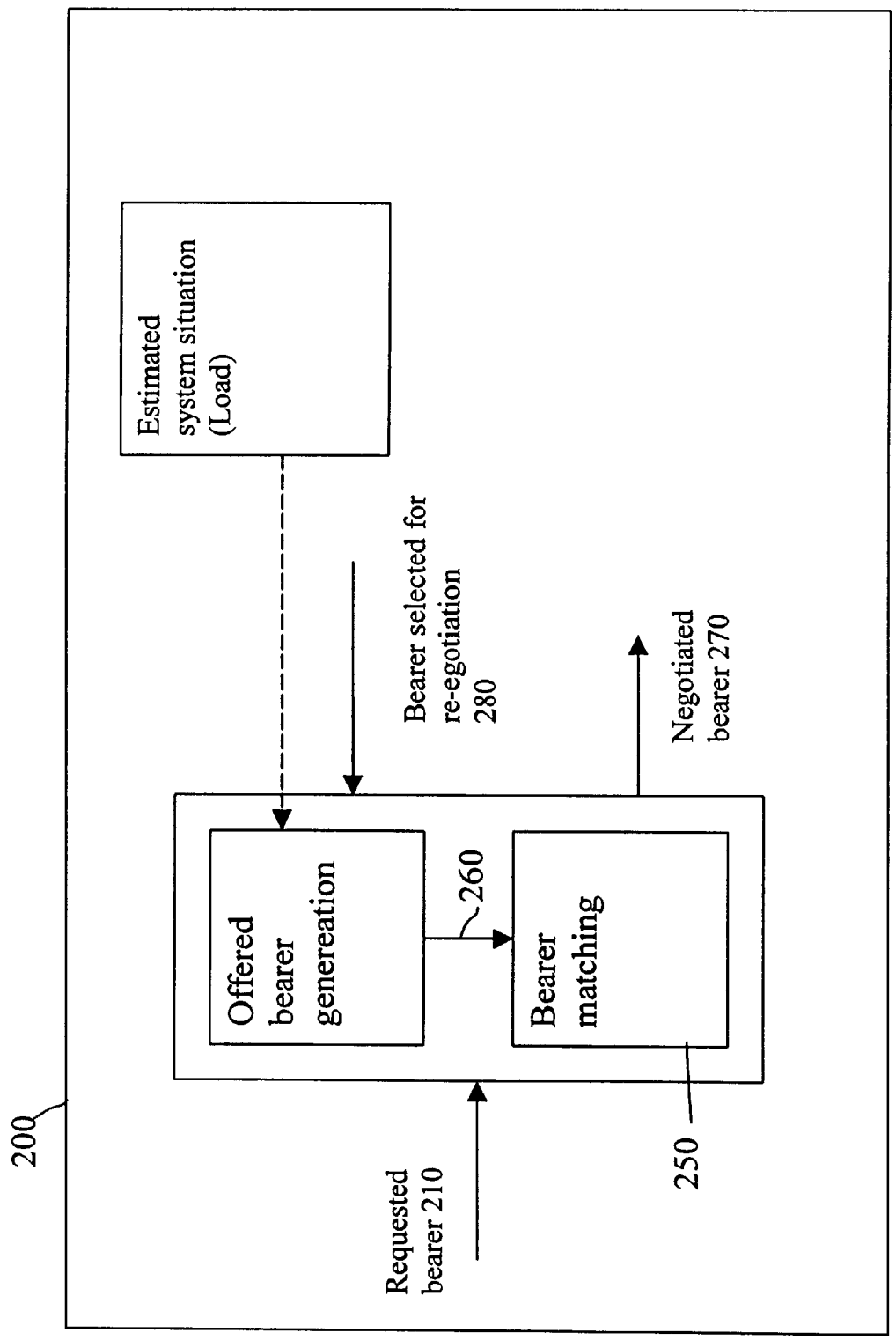
FIG. 4 illustrates an admission control function which is one part of the control system of FIG. 3

The admission control entity 130 of FIG. 3 is illustrated as 230 in FIG. 4 and has a part of the functions corresponding to the RABS manager of FIGS. 1 and 2. According to exemplary embodiments of the present invention, the admission control function 230 comprises an offered bearer generator 240 and a bearer matching function 250. A bearer request 210 (RSV), generated based on an original request from an application, is received by the admission control 230. The bearer request may comprise more than one >RSV or alternative RSVs. The alternative bearers can be described either by different discrete sets of attribute values, or one set of attributes where at least one attribute has a range of values in response to this bearer request.

The offered bearer generator 240 generates bearers (OSV) 260 that can be offered, for example, to a requesting mobile station. This offered bearer 260 may include priority (or cost) of the bearers. The generation of the offered bearer (OSV) 260 is based on the requested source and quality bearer attributes as described above. In addition, the offered bearer 260 may be based on the present load and interference level in the cell in question as well as the cells interfering with this cell and on mobile station specific information such as the mobile station uplink and downlink signal quality. For example, in a highly loaded cell, the cost in terms of radio resources is lower if the quality of the requested bearer (RSV) is low. Similarly, the cost is lower to admit a mobile station having a good (i.e., long term) signal quality.

The bearer matching function 250 receives the requested bearer (RSV) 210 and offered bearers (OSV) 260 and attempts to match an offered bearer 260 with a requested bearer 210. During the matching process, a determination is made as to whether there exists an offered bearer (OSV) 260 that fulfils the terms and conditions (regarding quality, priority, etc. ) specified in the requested bearers (RSV) 210. The priority portion of the bearer may be used for differentiation. That is, for example, if an offered bearer priority has been designated as high, the bearer can only be matched with important requests (i.e., those with high priority RSVs). The output of the matching step is a negotiated bearer (NSV) 270. If no match is found, the application request is denied; that is, the user with the bearer request (RSV) 210 is not admitted as no offered bearer (OSV) 260 has been generated by the offered bearer generator 240 that satisfies the bearer request 210.

As stated above, the offered bearer generator 240 that satisfies the bearer generator 240 and the bearer matching function 250 together may be seen as forming an admission control function 200, which receives a request for a connection and decides how to handle the request. However, instead of receiving a request and answering "yes" or "no" as in known admission control, the admission control function 200 of the present invention can receive a range of requests from the same application and select the most appropriate offered bearer for satisfying the requests. Multiple RSVs may be generated by the application where the value of at least one parameter may be different between the multiple RSVs. As an example, in $RSV_1$, the delay may be specified as 1 second and in $RSV_2$, it may be specified as 0,5 seconds. Alternatively, as a specified from of a multiple request, one RSV may be generated where one or more parameters may have a range of values specified. As an example, within one RSV, the FER may be specified as one value, but, the delay may be specified as a range between two values such as from 0,5 seconds to 1 second. As another example, the bit rate may be specified wit a range such as for example 32–64 kbps. This implies that any bit rate between these two values would be acceptable for the application. OSVs may also be generated in a similar manner. As described, the admission control function 200 is also able to handle different users and services differently.

Figures 5A, 5B:
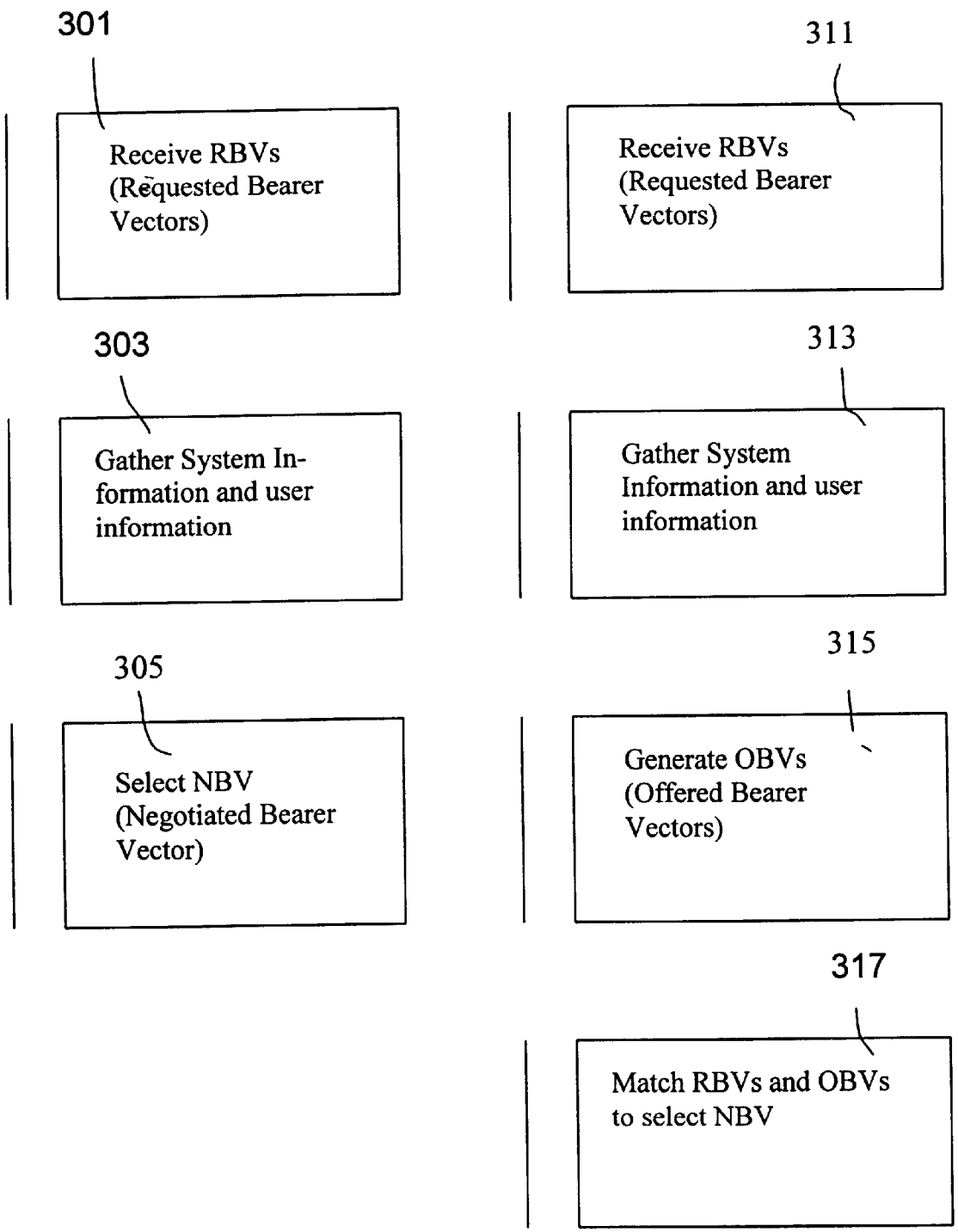
FIG. 5 illustrates bearer level definitions in accordance with the UMTS standard

The offering of a service or bearer vector (OSV) and the negotiation of a service or bearer vector (NSV) may take place sequentially or simultaneously according to preferred embodiments of the present invention. According to a first embodiment, as illustrated by FIG. 5(a), the generation of an OSV and the negotiation to obtain a RSV may be performed in one joint admission control step 305. In a second embodiment, as illustrated in FIG. 5(b), the generation of an OSV takes place in step 325 and the negotiation to obtain a RSV takes place in step 317. According to the second embodiment, offering of multiple bearers (or, OSVS) at step 315, in response to one or more RSVs (in step 311) and after gathering of system information (in step 313), precedes the negotiation of NSV in step 317. These two steps, i.e., 315 and 317, are sequential.

One method utilized by known admission control of handling multiple requests is to perform a sequential operation. That is, initially a preferred bearer is requested and if that preferred bearer does not result in admission, another bearer is requested until admission is achieved. This solution, however, results in significant additional signaling. As a result, the decision made by the admission control is not a informed as if all alternatives are known simultaneously and prior to admission control function being performed.

Figure 6:
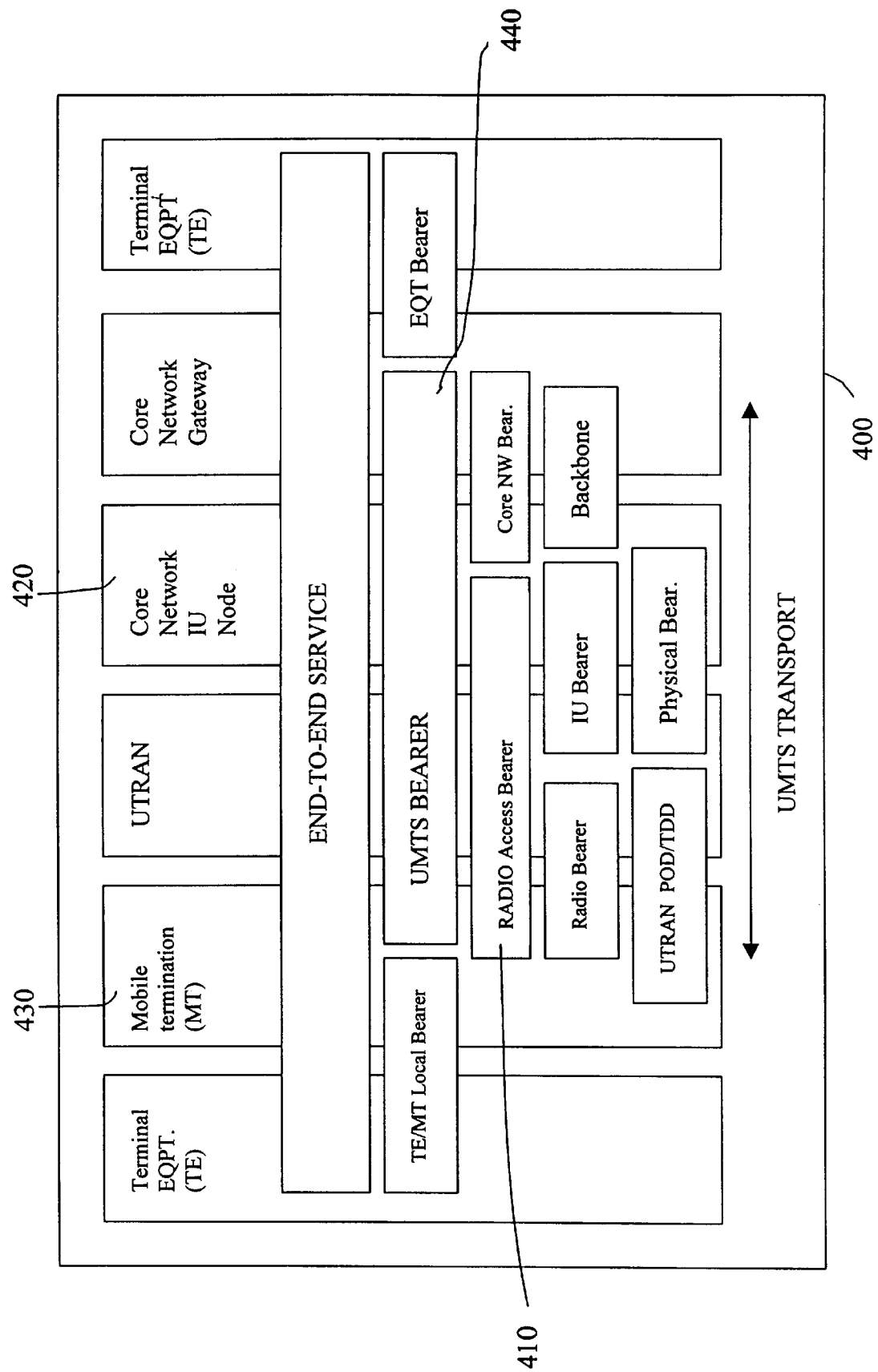
FIG. 6 illustrates a simplified view of bearer service request from terminal equipment

If the quality of the negotiated bearer degrades to an unacceptable level, then a new bearer has to be renegotiated which is illustrated in FIG. 4 as 280. According to exemplary embodiments of the present invention, as illustrated in FIG. 6, a multi-mode application in a universal mobile telecommunications standard (UMTS) is disclosed. In the UMTS system, a bearer structure 400 comprising several bearers each responsible for a different portion of the UMTS transmission are defined. In FIG. 6, a bearer service such as the UMTS bearer 440 is defined between the core network IU edge node (CN) 420 and the mobile termination node (MT) 430. A transmission between these two nodes forms a portion between two nodes with the service having certain QoS characteristics.

The characteristics are negotiated before commencement or transmission and therefore, are eventually part of the negotiated service vector, NSV. One bearer service that is defined is the radio access bearer (RAB) 410 which transports between a Core Network IU edge node 420 and a mobile termination node (MT) 430. As seen in FIG. 6, the defined bearer services form a hierarchic structure, i.e., in order to set up beneath the UMTS bearer service. The illustration of the RAB is for exemplary purposes only as negotiations may take place at all bearer service levels.

A core network comprises a gateway and an IU edge node. In a GSM system, the corresponding nodes are GMSC and MSC. For a GPRS system, the corresponding nodes are GGSN and SGSN. The user equipment is logically divided into terminal equipment (TE) and mobile termination (MT). The TE portion includes higher protocol layers that are UMTS specific. As a result, the TE portion of the user equipment may not be knowledgeable about the UMTS and the MT portion may not be aware of what application is being used.

As described above, an application may operate in different quality modes. For example, a video codec may have a normal quality mode and a good quality mode. In the good mode, the application generates a higher data rate than in the normal mode. These may be represented as different quality modes having guaranteed bit rates of 64 kbps and 128 kbps. The perceived video quality is better with 128 kbps than with 64 kbps. This kind of video codec can belong to either of the two families of adaptive and elastic applications. An adaptive application requires that the mode of operation is signaled from the intermediate network to the application, whereas an elastic application can operate in any mode without being informed by the intermediate network of the mode to use. In this exemplary embodiment, an adaptive video codec is assumed.

Figure 7:
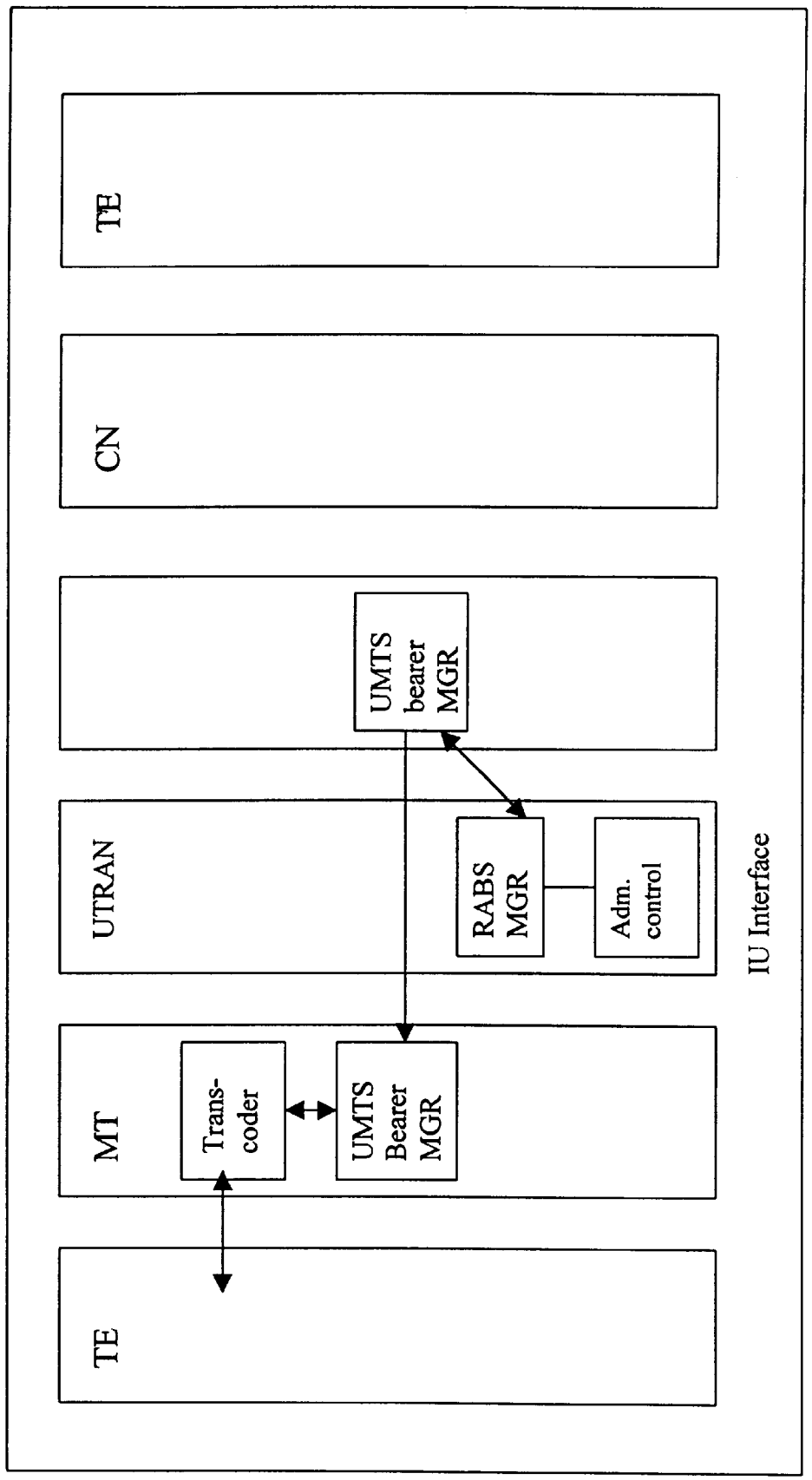
FIG. 7 illustrates an example of how the QoS request from the application will be signaled.

The QoS request from the application will be signaled as illustrated in FIG. 7. In present systems, only one of the data rates can be requested at any one time. Thus, a data rate corresponding to, for example, 128 kbps, may be requested by the application. This request is translated in to a UMTS bearer service and eventually result in a RAB request which still comprises only one RAB with one data rate.

According to exemplary embodiments of the present invention, the application can provide a multiple alternative request comprising both data rates with reference to the video codec application. The resulting RAB request will also include two alternative RABs each with one guaranteed bit rate. The RAB request may also include other attributes, including a "cost" the user is willing to pay for this RAB. The RAB request may be assigned an allocation/retention priority value. As an example, a priority value of 2 may be treated as being more important than a priority value of 3 but less important than a priority value of 1.

Upon receipt of this request, the admission control 510 (i.e., offered bearer generator 240 and bearer matching functions 250 of FIG. 4 within the UTRAN considers the request and returns a negotiated RAB which includes the data rate.

In UMTS of a WCDMA system, the offered bearer generator may consider such input parameters as: uplink interference level in the active set of base stations (the active set may be denoted as "a" which includes users 1 to n) to which the mobile station is connected, interference level in the cells interferred by the active set, signal quality in the connection between the mobile station and the active set of base stations, downlink transmit power in the active set, downlink transmit power in the cells interferred by the active set, downlink spreading codes used in the active set, queue sixes in UTRAN for other mobile stations connected to cell in the active set and memory, processing and buffer capacities of the nodes involved in the data transport (i.e., the MT, UTRAN and Core network Iu edge node). Based on these parameters, the offered bearer generator predicts the effects of an additional connection with data rates according to the request, and determines the "cost" at which to offer the data rates. For instance, it may include that the interference level in the active set of base station is too high to offer the higher data rate to the mobile station. Therefore, the lower data rate is more appropriate for this situation since the additional interference caused by this mobile station decreases with decreased data rate. The cost (expressed in terms of priority) is set very high for the high data rate services and lower for the low data rate service. The offered priority (i.e. the cost) reflects a level of importance assigned to a request of this bearer in order for the request to be admitted. If it is not possible t offer a certain bearer service due to resource limitation, the cost may be set to infinity and no connection will be possible in this scenario. In an unloaded system on the other hand, since the interference levels are low, both data rates (i.e., the 128 and 64 kbp) can be offered at a low cost.

In the particular example described above, the offered bearer generator considers the input parameters cited above and may include that:

i. the path loss between the mobile station and the active set by $P_{1,64}-P_{n,64}$ and $P_{1,128}-P_{n,128}$ (P representing the power) and increase the uplink interference in the active set $I_{1,64}-I_{n,64}$ and $I_{1,128}-I_{n,128}$ (I representing the interference) for bit rates of 64 kbps and 128 kbps, respectively;

ii. the current uplink interference in the in the active set is low enough to admit either of the bit rates which may increase the interference by $I_{1,64}$, $I_{n,64}$ and $I_{1,128}$, $I_{n,128}$ without risk of overloading;

iii. the current uplink interference in the active set is low enough to admit either of the bit rates without risk of overloading;

iv. the downlink power in the active set is such that admitting a 64 kbps bit rate and increasing the power by $P_{1,64}$, $P_{n,64}$ would not cause an overload in the system, but admitting a 128 kbps bit rate and increasing the power by $P_{1,128}$, $P_{n,128}$ could potentially cause retention of another already admitted RAB;

v. the downlink power in cells interferred by the active set is low enough to allow admission of either of the bit rates;

vi. there are enough free downlink spreading codes to allow admission of any of the two bit rates;

vii. queue sizes in the active set are small enough to allow admission of any of the two bit rates without causing excessive delay of other traffic;

viii. memory, processing and buffer capacities of the nodes involved in the data transport are available for supporting either of the two bit rates.

Thus, in the illustrated example, system and user situation is such that 64 kbps can be offered to a request of any priority without causing trouble to the system. An offered bearer with guaranteed bit rates of 64 kbps and allocation/retention priority of 3 (i.e., lowest possible priority) is formed. Bit rates of 128 kbps may also be offered but due to the downlink transmit power situation, it can only be offered to very important users. Therefore, an offered bearer is formed with guaranteed bit rates of 128 kbps and allocation/retention priority of 1.

Then, using requested and offered bearers as input, the bearer matching function generates a negotiated bearer to be used. In the example described above, the matching function will conclude, based on the priority values in request and offer, that the RAB with guaranteed bit rate of 64 kbps is the only possible selection for a negotiated bearer (NSV).

In another exemplary scenario, the downlink transmit power could allow admission of either bit rate with priority of 2 which would lead the matching function to select 128 kbps as the negotiated bearer. In yet another scenario, the downlink transmit power or any other common resource could be so scarce that admission of neither 64 kbps nor 128 kbps is allowed with priority 2. This would cause the matching function to return a request denial message instead of a negotiated bearer.

The negotiated bearer is translated back over the Iu interface and other interfaces to the application, informing the application as to the mode in which to operate. In the example highlighted above, the modes are good and normal. Other interfaces may include a radio interface. Since the application resides within the terminal equipment (TE), the TE must be informed of the outcome of the negotiation. Since the other TE must also be informed, the negotiation outcome must be signaled all the way from one TE to the other TE via the intermediate interface.

According to another exemplary embodiment of the present invention, an elastic application in UMTS is also disclosed. An application type is designated as being elastic if it can be carried by bearers of different quality without being explicitly informed about the mode of operation. An example of an elastic application is web browsing which can take place with a wide range of data rates. Hence, a network-dependent selection of bearer is still possible, but there is no need to explicitly inform the application as to which data rate is used.

Thus, the basic operation is the same as for the multi-mode-application. However, there is only one application request coming to UMTS and it is the subscription within UMTS that specifies that this particular application request can be alternatively supported by, for example, two radio access bearers having different rates or qulaity. Consequently, the bearer request over the Iu interface consists of two radio access bearers.

The offering and matching procedure is substantially the same except that the application need not be informed as to which bearer was selected, since it can only operate in one mode anyway.

With an adaptive application, the application has to know about potential re-negotiations that occur in the negotiated bearer (NSV) such as the bearer's inability to provide a particular delay, etc. These changes in the NSV have to be communicated or signaled back to the application so that the application may adopt to the changes in the NSV and changes its mode of operation.

In contrast, with an elastic application, no signaling back to the application is required. If one of the parameters of the NSV is re-negotiated, such as for example, delay, the application simply waits for the data. In this context, the application functions in a more tolerant manner, i.e., the application tolerates re-negotiations of the negotiated bearer and adjusts.

The invention provides an admission control system for structured handling of mixed services in a wireless system, which is necessary in future mixed service systems. It is applicable to existing systems such as GSM/IGPRS, WCDMA (UMTS) and WLAN, as well as any other wireless systems handling mixed services. The invention is not limited to wireless systems however.

The present invention has been described in terms of specific embodiments to facilitate understanding. The above embodiments, however, are illustrative rather than restrictive. It will be readily apparent to one skilled in the art that departures may be made from the specific embodiments shown without departing from the central spirit and scope of the invention. Therefore, the invention should not be regarded as being limited to the above examples, but should be regarded instead as being fully commensurate in scope with the following claims.

What is claimed is:

1. A method of providing radio access bearer services in a network comprising a core network and a radio access network on radio access bearers from the radio access network to the core network, comprising the following steps:
   a) recognizing one or more session traffic flows being sent or intended to be sent by an application,
   b) characterizing the recognized session traffic flow in the form of parameters needed for the determination of one or more radio access bearers,
   c) converting the parameters into radio access bearer attributes,
   d) requesting and establishing one or more radio access bearers defined by said attributes,
   e) mapping the one or more session traffic flows onto a correct radio access bearer established upon said request,
   f) indicating an end of the session, and
   g) releasing the one or more radio access bearers.

2. The method of claim 1, wherein when the session traffic has been sent on an available existing radio access bearer, the session is recognized and characterized in steps a) and b) respectively by means of packet headers of packets in a respective session traffic flow.

3. The method of claim 2, wherein different data streams from a same source are characterized on a per packet basis to map the data streams to the correct bearer.

4. The method of claim 1, wherein step a) is performed by receiving information about one or more session traffic flows intended to be sent by an application, and identifying the session using said information, and step b) is performed by characterizing the identified session traffic flow in the form of parameters needed for the determination of one or more radio access bearers using said information.

5. The method of claim 1, wherein in step b) and c) changes in the parameters are recognized during an ongoing session.

6. The method of claim 1, wherein in step b) the session is characterized using parameters including at least one of address information, type of service, length of packet, identification data, delay allowed, bit rate, radio resources, a frame error ratio, a bit error ratio, and traffic conditions.

7. The method of claim 6, wherein a range of values is specified for the parameters.

8. The method of claim 1, wherein the bearer request in step d) comprises, in addition to the radio access bearer attributes, at least one of source information and priority information.

9. The method of claim 8, wherein said source information comprises a range of values.

10. The method of claim 8, wherein said source information comprises a rate per unit time at which the application handles data.

11. The method of claim 8, wherein said priority information classifies a priority of the bearer request.

12. The method of claim 1, wherein the application is an adaptive or elastic application.

13. The method of claim 1, wherein the parameters comprise an interference level in an active set of base stations, said active set of base stations representing base stations to which a mobile station is connected.

14. The method of claim 1, wherein when the session traffic is preceded by a standard end-to-end signaling/session initiation protocol, the session is identified and characterized in steps a) and b) respectively by intercepting and interpreting end-to-end session signaling messages.

15. The method of claim 1, wherein when the session traffic is preceded by a direct signaling message from the application to a radio access bearer management node in the network, the session is identified and characterized in steps a) and b) respectively by interpreting the direct signaling message.

16. The method of claim 1, wherein the converting of the parameters in step c) into radio access bearer attributes is carried out using at least one of a local static conversion database, a remote conversion database, a user profile, and load indicators from bearer management.

17. The method of claim 5, wherein the session is periodically probed to recognize changes in application requirements.

18. The method of claim 17, wherein the changes in application requirements are recognized as a consequence of a change in the parameters of the on-going session sent by the application.

19. The method of claim 5, wherein the parameters by which the radio access bearer was defined for the on-going session are changed as a consequence of an end-to-end signalling message from the application to change the parameters.

20. The method of claim 5, wherein the parameters by which the radio access bearer was defined for the on-going session are changed as a consequence of a signaling message from the application to a radio access bearer management node in the network to change the parameters.

21. The method of claim 18, wherein changes to be made in the parameters during an ongoing session are identified by the application as a result of a message sent to the application from the radio access network, the message carrying information corresponding to changes in the radio access network.

22. The method of claim 5, wherein changes to be made in the parameters are a result of a message sent from the radio access network, the message carrying information about changes in the radio access network, whereby the attributes are changed directly without waiting for the application to carry out the parameter changes.

23. An apparatus for handling radio access bearer services of different applications in a network having a core network and a radio access network through radio access bearers between said networks, as introduced in the network between said core network and radio access networks, the apparatus comprising:
   a) means for receiving information identifying and corresponding to one or more session traffic flows intended to be sent by an application,
   b) means for characterizing the identified session traffic flow in the form of parameters needed for determining one or more radio access bearers,
   c) means for converting the parameters into radio access bearer attributes,
   d) means for requesting and establishing one or more radio access bearers defined by said attributes,
   e) means for mapping the one or more session traffic flows onto a correct established radio access bearer,
   f) means for indicating an end of the session, and
   g) means for releasing the one or more radio access bearers.

24. The apparatus of claim 23, further comprising means for recognizing changes during an ongoing session.

25. The apparatus of claim 23, wherein the apparatus is a logical node introduced between the core network and the radio access network.

26. The apparatus of claim 25, wherein the logical node is on the core network side with respect to the interface between the core network and radio access network.

27. The apparatus of claim 23, wherein the apparatus comprises three functional entities.

28. The apparatus of claim 27, wherein one of the functional entities is a session classifier including the receiving, characterizing, converting and indicating means.

29. The apparatus of claim 28, wherein the session classifier also comprises means for probing a session periodically for recognizing changes in said parameters.

30. The apparatus of claim 29, wherein one of the functional entities is a radio access bearer service manager including the requesting and releasing means and a means for recognizing changes during an ongoing session.

31. The apparatus of claim 30, wherein the radio access bearer service manager also comprises means for receiving session requests from the session classifier.

32. The apparatus of claim 31, wherein the radio access bearer service manager also comprises means for receiving messages from the radio access network corresponding to changes in the radio access network and means for sending the messages to the application.

33. The apparatus of claim 32, wherein the radio access bearer service manager also comprises means for translating the messages to an application understandable format and means for sending the translated messages to the application.

34. The apparatus of claim 32, wherein the radio access bearer service manager also comprises means for changing the attributes in response to receiving a message from the radio access network corresponding to changes in the radio access network.

35. The apparatus of claim 23, wherein one of the functional entities comprises means for mapping user data traffic which includes the session traffic mapping means.

* * * * *